No. 707,167. Patented Aug. 19, 1902.
N. H. SEELYE.
BEARING FOR SHAFTS OF MACHINES.
(Application filed Feb. 7, 1901.)
(No Model.)
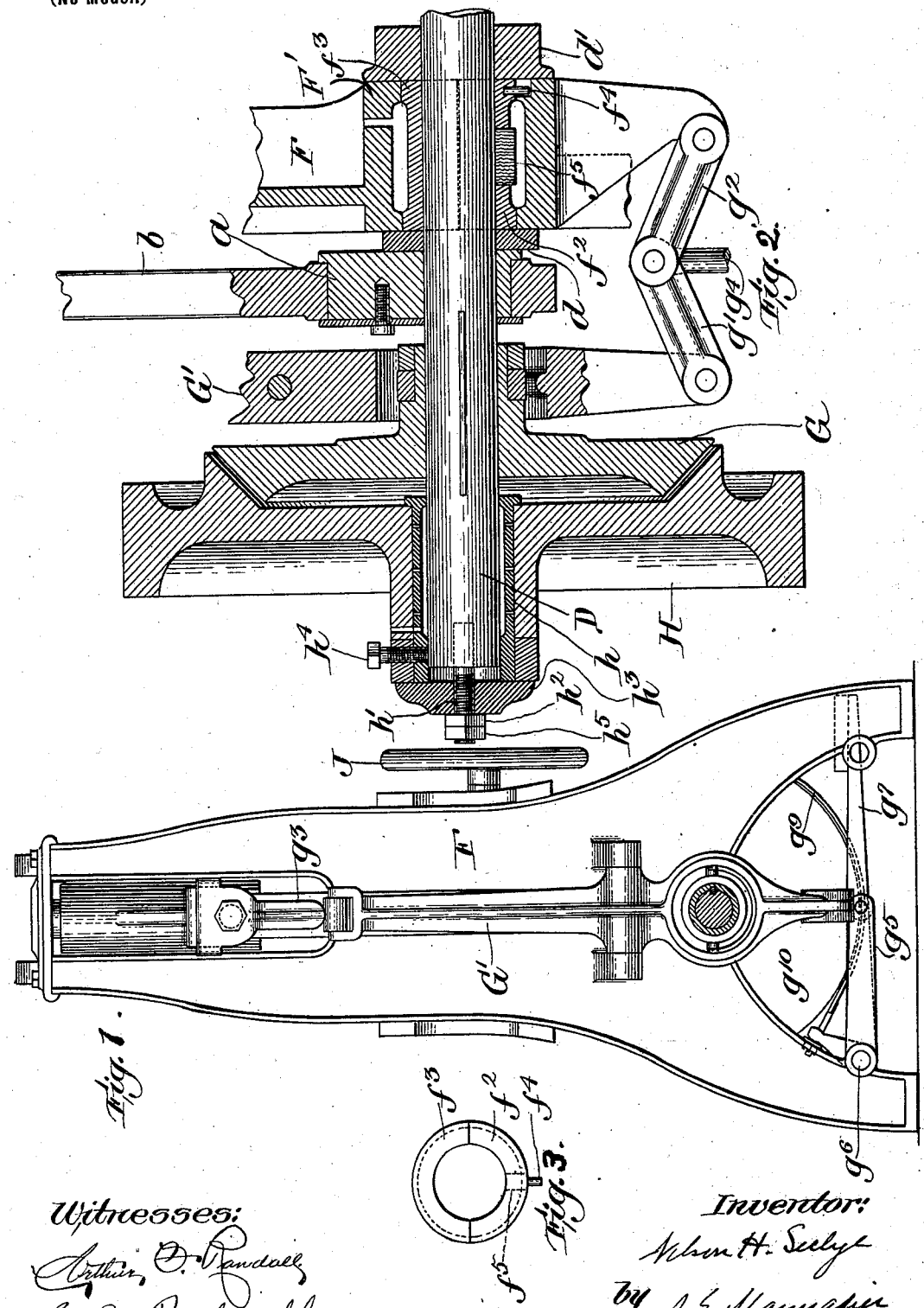
Witnesses:
Arthur D. Randall
G. A. Rockwell.
Inventor:
Nelson H. Seelye
by J. E. Maynadier
Attorney.

UNITED STATES PATENT OFFICE.

NELSON H. SEELYE, OF WINCHESTER, MASSACHUSETTS.

BEARING FOR SHAFTS OF MACHINES.

SPECIFICATION forming part of Letters Patent No. 707,167, dated August 19, 1902.

Application filed February 7, 1901. Serial No. 46,418. (No model.)

*To all whom it may concern:*

Be it known that I, NELSON H. SEELYE, of Winchester, in the county of Middlesex and State of Massachusetts, have invented an Improved Bearing for Shafts of Machines, of which the following is a specification, reference being had to the accompanying drawings.

In machines in which a beam is reciprocated by means of a rotating shaft the bearings of the shafts are subjected to very severe strains at each reciprocation of the beam; and the object of my invention is to provide bearings for such shafts much better adapted for the class of machines than those heretofore used.

My invention consists in the combination, in a machine-frame having a main member through which its driving-shaft extends, of that shaft, that member provided with a boss integral therewith and having a cylindrical interior, a sleeve with a cylindrical exterior to fit the interior of the boss and a cylindrical interior to fit the shaft, and means to hold the sleeve from moving in the cylindrical interior of the boss when in use.

In the drawings, Figure 1 is an end elevation, partly in section, of a machine with my improved bearings. Fig. 2 shows my shaft-bearing and some of the adjacent parts in section, and Fig. 3 is an end view of the two-part sleeve making a part of my shaft-bearing.

The frame of the machine is composed of uprights F and suitable cross-pieces. Each upright F has a boss F', whose bore is of considerably greater diameter than the main shaft D, and within each bore is a bearing which is a cylindrical sleeve in two parts $f^2$ $f^3$, (see Figs. 2 and 3,) which when together fit in the boss F', and the inner surfaces of this two-part sleeve form the bearing in which shaft D revolves. This sleeve (shown detached in Fig. 3) is turned on its exterior to fit the bore of boss F' and is held stationary in boss F' by the dowel $f^4$ entering a recess in boss F' and by collars $d$ $d'$ on the main shaft. The wick $f^5$ supplies oil to the bearing from the oil-receptacle formed by a space between the outer surface of the two-part sleeve and the inner surface of the bore of boss F'.

When the belt-wheel H is connected with shaft D by the clutch G, the shaft D is driven and the beam A reciprocated as long as the belt-wheel H and shaft D are connected, the strain upon the bearings being so severe that bearings as heretofore made in this class of machines have long given much trouble, as they are frequently out of order and repairs are expensive and not readily made. This serious defect is almost wholly remedied by my improved bearings.

The means for adjusting belt-wheel H, the mechanism for actuating shipper G' to cause firm contact between clutch G and belt-wheel H, and other features of the machine shown in the drawings are no part of my present invention, but are described and claimed in my application filed September 20, 1901, Serial No. 75,734, series of 1900.

What I claim as my invention is—

In a machine-frame having a main member F through which its driving-shaft extends, the combination of that shaft; member F provided with a boss F' integral therewith and having a cylindrical interior; a sleeve with a cylindrical exterior to fit the interior of the boss F' and a cylindrical interior to fit the shaft; and means to hold the sleeve from moving in the cylindrical interior of the boss F' when in use substantially such as described.

NELSON H. SEELYE.

Witnesses:
J. E. MAYNADIER,
C. B. MAYNADIER.